Patented Jan. 11, 1949

2,458,636

UNITED STATES PATENT OFFICE 2,458,636

PROCESS FOR PRECIPITATING POLYMER FROM AQUEOUS EMULSION

Louis Plambeck, Jr., Wilmington, Del., assignor to E. I. du Pont de Nemours & Company, Wilmington, Del., a corporation of Delaware No Drawing. Application February 19, 1946, Serial No. 648,815

6 Claims. (Cl. 260—29.6)

This invention relates to synthetic polymeric materials. More particularly, it relates to a process for isolating synthetic polymeric materials by coagulation of their aqueous dispersions.

This application is a continuation-in-part of my copending application Serial No. 518,411, filed January 15, 1944, now abandoned.

One of the preferred methods of preparing synthetic polymeric materials consists in carrying out the polymerization of the parent monomer in aqueous emulsion. This method, which is widely used in industrial practice, has the advantage that the polymerization is in general rapid and readily controllable. The isolation of polymers from the resulting aqueous dispersions is usually carried out by freezing, by spray drying, by the addition of a water-soluble precipitant such as alcohol or acetone, or, preferably, by the addition of a water-soluble electrolyte. In large scale operations, the addition of an electrolyte is the most widely used isolation method. However, although this technique is very satisfactory for unsaturated polymers such as the rubbery polymers of conjugated dienes such as butadiene and chloroprene and for low softening polymers such as polyvinyl acetate, it is not entirely satisfactory for dispersions of high softening, water-insensitive, essentially saturated polymers, i. e. polymers free from aliphatic type carbon-to-carbon unsaturation such as the polymers and copolymers of vinyl chloride, methyl methacrylate, etc. With a polymer dispersion of this type, the addition of electrolytes results, in general, in a precipitate which is so fine and slimy that it is difficult to wash it free from impurities such as dispersing agents, catalyst residues, etc. Polymer precipitates of this nature are objectionable in industrial practice because of their tendency to pass through the filters and eventually to clog them partially or completely.

An object of this invention is to provide a new process of coagulating aqueous dispersions of high softening, essentially saturated polymers of monoethylenic monomers. Another object is to provide a polymer coagulating process whereby the polymer is obtained in a form which is easily filterable and washable. Other objects will appear hereinafter.

These objects are accomplished by the following invention, wherein a synthetic addition polymer, essentially free from non-aromatic carbon-to-carbon unsaturation and having a softening point above about 60° C., of a monomer or monomers having but one acyclic carbon-to-carbon unsaturation, and that ethylenic, is precipitated from its aqueous dispersion by adding thereto a small amount of a water-insoluble, unpolymerizable, swelling agent for the polymer, which agent is liquid at the operating temperature and has a vapor pressure at the boiling point of water (100° C.) of at least 15 mm. (Hg.), and then a water-soluble electrolyte. The precipitated polymeric material is then isolated.

In the preferred practice of this invention, a small amount, e. g., 5% to 10%, based on the weight of the polymer, of a water-immiscible, unpolymerizable, swelling liquid hydrocarbon boiling below 200° C., such as toluene or xylene, is added to the aqueous emulsion of the polymer, followed by the addition of the electrolyte and, preferably, by heating to or near the boiling point of the mixture in order to complete the coagulation and to remove all or most of the swelling agent. The presence of the swelling agent has the unexpected and surprising effect of causing the polymer, upon subsequent addition of an electrolyte, to precipitate in the form of coarse, easily filterable and washable particles, rather than as the finely divided, difficult-to-handle slurry which results when the electrolyte is used alone.

The invention will be better understood by reference to the following illustrative examples, in which parts are by weight.

Example I

To 275 parts of a vinyl chloride/diethyl fumarate (86/14) copolymer emulsion containing 32% of copolymer having a softening point of about 75° C. and prepared as described below is added at room temperature and with vigorous stirring 8.8 parts of toluene (about 10% based on the solids content of the latex). After thorough mixing, there is added to the suspension 15 parts of a 10% aqueous solution of aluminum sulfate. The mobile latex coagulates to a soft, thick mass which thins out to a slurry on continued stirring. This slurry is then heated to 85° to 90° C. by injection of steam while stirring, whereupon the polymer particles become harder and denser, while most of the toluene is driven off. When a test sample shows that the polymer settles rapidly and easily, heating and stirring are discontinued and the precipitate is filtered and washed free of electrolyte, dispersing agent, etc. by decantation and filtering.

The copolymer of this example is prepared, as described in application Serial No. 427,921, filed January 23, 1942, by H. W. Arnold, now Patent No. 2,404,780 issued July 30, 1946, by stirring in an autoclave at 40° C. an aqueous emulsion, brought to a pH of 2.5, of vinyl chloride with about ⅕ of the total diethyl fumarate and adding the remainder of the diethyl fumarate during a period of 24 hours, after which the polymerization is completed by further heating of one hour. There is used as the dispersing agent a commercial product containing 30–35% of an alkali metal salt of sulfonated paraffin oil and as the catalyst a small amount of ammonium perdisulfate.

When the addition of toluene is omitted, other conditions being the same, the polymer precipitates as a fine s'ime which at first passes through the filter, then finally clogs it completely. A somewhat more satisfactory precipitate is obtained (in the absence of toluene) when the aluminum sulfate is added to the latex at elevated temperature (85° to 90° C.), but still, the product is in no way comparable, from the standpoint of ease of handling and purifying, to the product obtained in the presence of toluene.

Example II

A polyvinyl chloride dispersion containing 33% solids is prepared, as described in application Serial No. 427,922, filed by Arnold, Brubaker and Dorough on January 23, 1942, now Patent No. 2,404,781 issued July 30, 1946, by stirring for four hours at 40° C. in an autoclave an emulsion (brought to pH 2.5) of vinyl chloride in water containing ammonium perdisulfate as the catalyst and the sodium salt of sulfonated paraffin oil as the dispersing agent. The polyvinyl chloride so obtained has a softening point of about 83° C. To 150 parts of this dispersion is added 4.3 parts of toluene and 250 parts of water at room temperature with vigorous stirring. The polymer is then precipitated by adding to the dispersion five parts of 10% aqueous aluminum sulfate, after which steam is led into the mixture, while stirring is continued, to bring the temperature to 85° to 90° C., which completes the coagulation and drives off the toluene. The resulting hard, rapidly settling polymer particles are washed three times with water by decantation, then washed on a filter with water and methanol. Washing and filtering offer no difficulties whatsoever, whereas the same polymer, when coagulated under similar conditions except that toluene is omitted, can be washed and filtered only through lengthy and laborious manipulations.

Example III

Monomeric methyl methacrylate is polymerized in aqueous emulsion at a temperature below 60° C. with 0.1% sodium bisulfite catalyst and commercial sodium cetyl sulfate (3.3% active ingredient based on the monomer) as dispersing agent to give a dispersion containing 30% to 33% by weight of a polymer having an average molecular weight of about 400,000 and a softening point of about 121° C. One hundred (100) parts of this dispersion is steamed to remove any unreacted monomer, diluted with 400 parts of water, then treated with 8.7 parts of toluene with stirring. To effect coagulation, 100 parts of 10% aqueous aluminum sulfate is added at room temperature. The polymer precipitates in coarse particles which are easily washed to remove the soluble salts and the impurities. The polymer is then air dried to remove water and any remaining toluene.

In the case of a rather high softening polymer like the high molecular weight polymethyl methacrylate of this example, it is advantageous to use more of the swelling agent than is needed with somewhat lower softening polymers, e. g., those of the preceding examples. If, instead of 8.7 parts of toluene, there is used only 3.5 parts per 100 parts of the above described polymer emulsion (about 10% based on the solids content), the polymer is again precipitated in a satisfactory state of division, but the particles are not quite as hard and tend to stick together, with the result that the rate of flow of the wash water on the filter is somewhat decreased. If no toluene is used, however, washing and filtering operations become a practical impossibility.

The process of this invention is applicable to the coagulation of aqueous emulsions of any high softening, water-insensitive synthetic polymer essentially free from ethylenic unsaturation, i. e., any polymer of a monomer or monomers having but one non-aromatic carbon-to-carbon unsaturation, and that ethylenic. Non-aromatic carbon-to-carbon unsaturation is readily determined by the decolorization of bromine solution without evolution of hydrogen bromide. The term "softening point" is used here to denote the point of softening under load, and is not to be confused with sticking point or melting point. The softening point is determined, as described in British Patent 570,331. This is a test similar to A. S. T. M. D648–45T (see also Simonds and Ellis, Handbook of Plastics, page 98) but gives somewhat higher values. The procedure in this test is as follows:

A molded bar of the material, 2.5 x 0.5 x 0.05", is rigidly clamped at one end and loaded with a 27.5 gram weight applied 2" from the point of support and in the plane of the 0.5" dimension. The softening point is defined as that temperature, plus or minus 1° C., at which the bar deforms 0.06" when it is heated in a liquid bath at the rate of 2° C. per minute.

The polymers to which the process of the present invention is particularly applicable have a softening point above about 60° C., since lower softening polymers of monoethylenic compounds, as well as unsaturated polymers such as the diene polymers and copolymers, can be readily coagulated from their aqueous emulsions by conventional methods. Furthermore, the process is essentially of advantage with polymers without plasticizers and is of special benefit with polymers (including co-polymers) of monoethylenic vinyl and vinylidene compounds, i. e., compounds having a terminal methylene ($CH_2$) group attached to the rest of the molecule through an ethylenic double bond. In addition to the polymers of the examples, the process is applicable to many others, including polystyrene, polyvinyl bromide, polyvinylidene chloride, copolymers of vinyl chloride and dialkyl maleates (or fumarates), copolymers of vinyl chloride and vinyl acetate, copolymers of vinyl chloride and methyl acrylate, copolymers of vinyl chloride and vinylidene chloride, etc. A particularly preferred copolymer is the vinyl chloride-diethyl fumarate (95:5) polymer, which lends itself particularly well to the technique of this invention.

Any unpolymerizable swelling agent for the polymer which is liquid at the temperature of coagulation and substantially water-insoluble may be used, provided it is sufficiently volatile to permit easy removal through evaporation or heating, if desired. In practice, this means that the swelling agent should have a vapor pressure of at least 15 mm. at the boiling point of water (100° C.). The function of the swelling agent is believed to be that of a temporary plasticizer which improves the character of the coagulum, yet is easily removed therefrom. It is for this reason that other plasticizers should not be present. Thus the swelling agents are sharply distinguished in their action from the conventional plasticizers which are non-volatile substances designed to remain in the polymer permanently. Among the suitable swelling agents may be mentioned benzene, toluene, o-, m- and p-xylene, chlorobenzene, nitrobenzene, anisol, trichloroethylene, carbon tetrachloride, low boiling kerosenes, cyclohexane, etc. The choice of a particular swelling agent will be governed to a considerable degree by its swelling action on the polymer to be coagulated. For this purpose, a liquid is deemed to be a swelling agent when the finely divided polymer, upon immersion in the liquid (at or below the temperature of coagulation of the aqueous polymer suspension) increases in volume at least 5% within a short time, e. g., within less than 15 minutes. The preferred swelling agents, from the standpoint of satisfactory results with many polymers and economy, are the aromatic hydrocarbons boiling below 200° C., in particular, toluene and the commercial mixture of xylenes. If desired, two or more volatile swelling agents may be used in combination. The swelling agent must be substantially unpolymerizable under the experimental conditions used, i. e., up to temperatures of at least 100° C. since a polymerizable swelling agent would act in effect like excess polymerizable monomer, which usually has no beneficial influence on the nature of the coagulate and causes undesirable results (e. g., crazing of films) if present in the final polymer. The swelling agent must be substantially insoluble in water at temperatures up to 100° C. if satisfactory results are to be obtained. It must have an adequate vapor pressure at this point if it is to be conveniently and practically removed by methods available to the industry, e. g. steam distillation.

With most polymeric materials it is unnecessary to use more than 3% to 10% of the swelling agent, based on the weight of the polymer present in the emulsion. However, with high softening polymers, it is desirable to use more of the swelling agent than with lower softening polymers, e. g., up to 15% (by weight of the polymer) and in extreme cases, even up to 25%. An excess of swelling agent beyond the necessary quantity should be avoided since too much swelling agent may make the polymer particles coalesce in a gummy mass. For practical purposes, there should not be used more than 30% of the swelling agent, the preferred range being between about 3% and about 15%.

In the coagulation step, there may be employed any of the water-soluble electrolytes well known in the art for that use. Two particularly good electrolytes are aluminum sulfate and calcium chloride. Other satisfactory coagulants are sodium chloride, ammonium chloride, potassium bromide, magnesium sulfate, barium chloride, lead acetate, sodium sulfate, etc. Organic electrolytes such as sodium trichloroacetate may be used, but the inorganic salts are in general cheaper and give better results. The preferred electrolytes are the strong acid salts of polyvalent metals. The electrolyte may be added as a solid, or, preferably, as an aqueous solution. In general, it is desirable to use from about 0.5% to about 30% of electrolyte, based on the weight of the polymer.

The coagulation may be carried out at any desired temperature up to the boiling point of the emulsion. It is often desirable to add the swelling agent and the electrolyte at room temperature, then to raise the temperature to 80% to 100° C. since a harder polymer precipitate is often obtained by following this procedure. If the swelling agent is low boiling, the operation may be carried out in a closed vessel.

In the preferred practice of the invention, the swelling agent is added only after polymerization of the monomer is complete or substantially complete since if it is added during the polymerization, the rate of the latter is, in general, decreased and, furthermore, there is the danger that part or all of the swelling agent may evaporate. This is especially true if the latex is steamed after polymerization to remove any unpolymerized monomer. It is also preferred to add the swelling agent before the electrolyte since if added after the electrolyte, it does not readily come in contact with the particles of precipitated polymer.

Preferably, the bulk of the swelling agent is removed during or immediately after coagulation of the polymer by steaming, i. e., bringing the aqueous reaction medium to an elevated temperature, e. g., between 75° C. and its boiling point. If desired, removal of the swelling agent may also be effected by simply filtering off the polymer, washing it and drying it in air or at reduced pressure, if necessary with gentle heating, or both methods may be combined. It is in general harmless to leave minute amounts of the swelling agent adhering to the polymer since it will not be present in sufficient amounts to cause permanent plasticization.

The above description and examples are intended to be illustrative only. Any modification thereof or variation therefrom which conforms to the spirit of the invention is intended to be included within the scope of the claims.

What is claimed is:

1. Process for obtaining, in form suitable for isolation by filtration, a macromolecular polymer of monomer components consisting of vinyl chloride and diethyl fumarate, which polymer is precipitated from aqueous emulsion by water-soluble electrolytes in a finely divided and difficultly filtrable form, which comprises adding from 3 to 15%, based on the weight of the polymer, of toluene to a completely polymerized aqueous emulsion of said polymer, coagulating the emulsion by the addition thereto of aluminum sulfate and thereafter removing the toluene.

2. Process for obtaining, in form suitable for isolation by filtration, a macromolecular saturated vinyl chloride polymer which, in the form of a molded bar 2.5 by 0.5 by 0.05 inch when rigidly clamped at one end, loaded with a 27.5 gram weight applied two inches from the point of support and in the plane of the 0.05 inch dimension, and heated in a liquid bath at the rate of two degrees centigrade per minute does not deform 0.06 inch below 60° C. and which polymer is precipitated from aqueous emulsion by water-soluble electrolytes in a finely divided and difficultly filtrable form, which comprises adding from 3 to 15%, based on the weight of the polymer, of toluene to a completely polymerized aqueous emulsion of said polymer, coagulating the emulsion by the addition thereto of a water-soluble salt of a polyvalent metal and an inorganic acid and thereafter removing the toluene.

3. In the isolation by coagulation of aqueous emulsion and filtration therefrom of a saturated addition polymer which, in the form of a molded bar 2.5 by 0.5 by 0.05 inch when rigidly clamped at one end, loaded with a 27.5 gram weight applied two inches from the point of support and in the plane of the 0.05 inch dimension, and heated in a liquid bath at the rate of two degrees centigrade per minute does not deform 0.06 inch below 60° C. and of a monomer composition in which each monomer has but one aliphatic carbon-to-carbon unsaturation and that is ethylenic, which polymer is precipitated from aqueous emulsion by water-soluble electrolytes in a finely-divided and difficultly filtrable form, the improvement which comprises adding to the aqueous emulsion of said polymer, prior to the coagulation by a water-soluble electrolyte, a water-insoluble, unpolymerizable, aromatic liquid hydrocarbon swelling agent for said polymer, which swelling agent boils below 200° C., in amount from 3 to 30%, based on the weight of the polymer, but less than the amount sufficient to cause the polymer to coalesce to a gummy mass and, after coagulation, evaporatively removing the liquid hydrocarbon.

4. In the isolation by coagulation of aqueous emulsion and filtration therefrom of a saturated addition polymer of a monomer composition in which each monomer has but one aliphatic carbon-to-carbon unsaturation and that is ethylenic, which polymer, in the form of a molded bar 2.5 by 0.5 by 0.05 inch when rigidly clamped at one end, loaded with a 27.5 gram weight applied two inches from the point of support and in the plane of the 0.05 inch dimension, and heated in a liquid bath at the rate of two degrees centigrade per minute does not deform 0.06 inch below 60° C. and which polymer is precipitated from aqueous emulsion by water-soluble electrolytes in a finely-divided and difficultly filtrable form, the improvement which comprises adding to the aqueous emulsion of said polymer, prior to the coagulation by a water-soluble electrolyte, a water-insoluble, unpolymerizable liquid organic swelling agent for said polymer which swelling agent has a vapor pressure at 100° C. of at least 15 mm. in amount from 3 to 30%, based on the weight of the polymer, but less than the amount sufficient to cause the polymer to coalesce to a gummy mass and, after coagulation, evaporatively removing the swelling agent.

5. Process for obtaining, in form suitable for isolation by filtration, a saturated addition polymer of a monomer composition wherein each monomer has but one aliphatic carbon-to-carbon unsaturation and that is ethylenic, which polymer, in the form of a molded bar 2.5 by 0.5 by 0.05 inch when rigidly clamped at one end, loaded with a 27.5 gram weight applied two inches from the point of support and in the plane of the 0.05 inch dimension, and heated in a liquid bath at the rate of two degrees centigrade per minute does not deform 0.06 inch below 60° C. and which poylmer is precipitated from its aqueous emulsion in finely divided and difficulty filtrable form, which comprises adding to a completely polymerized aqueous emulsion of said polymer a water-insoluble, unpolymerizable, liquid organic swelling agent for said polymer, which swelling agent has a vapor pressure at 100° C. of at least 15 mm., in amount from 3 to 30% based on the weight of the polymer but less than that sufficient to cause coalescence of the polymer particles to a gummy mass, coagulating the aqueous polymer emulsion by the addition thereto of a water-soluble electrolyte and thereafter evaporatively removing the swelling agent.

6. Process for obtaining, in form suitable for filtration, a polymer of a monomer composition in which each monomer has a $CH_2=C=$ group and the double bond on the terminal $CH_2$ is the only aliphatic carbon-to-carbon unsaturation, which polymer in the form of a molded bar 2.5 by 0.5 by 0.05 inch when rigidly clamped at one end, loaded with a 27.5 gram weight applied two inches from the point of support and in the plane of the 0.05 inch dimension, and heated in a liquid bath at the rate of two degrees centigrade per minute does not deform 0.06 inch below 60° C. and which polymer is coagulated from aqueous emulsion by water-insoluble electrolytes in a finely-divided and difficultly filtrable form which comprises adding to the aqueous emulsion of said polymer a water-insoluble unpolymerizable, liquid organic swelling agent for said polymer, which swelling agent has a vapor pressure at 100° C. of at least 15 mm., in amount from 3 to 30% based on the weight of the polymer but but less than that sufficient to cause coalescence of the polymer particles to a gummy mass, coagulating the aqueous polymer emulsion by the addition thereto of a water-soluble electrolyte, and thereafter evaporatively removing the swelling agent.

LOUIS PLAMBECK, Jr.

REFERENCES CITED

The following references are of record in the file of this patent:

UNITED STATES PATENTS

| Number | Name | Date |
| --- | --- | --- |
| 2,193,613 | Alexander | Mar. 12, 1940 |
| 2,337,681 | Pollack | Dec. 28, 1943 |

FOREIGN PATENTS

| Number | Country | Date |
| --- | --- | --- |
| 691,382 | Germany | May 24, 1940 |

Certificate of Correction

Patent No. 2,458,636.  January 11, 1949.

LOUIS PLAMBECK, Jr.

It is hereby certified that error appears in the printed specification of the above numbered patent requiring correction as follows:

Column 6, line 2, for "80% to 100% C." read *80° to 100° C.*;

and that the said Letters Patent should be read with this correction therein that the same may conform to the record of the case in the Patent Office.

Signed and sealed this 24th day of May, A. D. 1949.

[SEAL]

THOMAS F. MURPHY,
*Assistant Commissioner of Patents.*